United States Patent [19]

Meyer

[11] Patent Number: 5,549,727
[45] Date of Patent: Aug. 27, 1996

[54] TROUGH ASSEMBLY

[75] Inventor: Willi Meyer, Effretikon, Switzerland

[73] Assignee: Emhart Glass Machinery Investments Inc., Wilmington, Del.

[21] Appl. No.: 353,849

[22] Filed: Dec. 12, 1994

[30] Foreign Application Priority Data

Dec. 16, 1993 [GB] United Kingdom ............. 9325781

[51] Int. Cl.⁶ .................................................. C03B 7/16
[52] U.S. Cl. ............................................. 65/225; 65/304
[58] Field of Search ........................... 65/225, 223, 224, 65/207, 304; 193/22, 15

[56] References Cited

U.S. PATENT DOCUMENTS 4,566,894  1/1986  Kulig et al. ...................... 65/304
5,298,049  3/1994  Meyer ................................ 65/225

Primary Examiner—Donald E. Czaja
Assistant Examiner—Calvin Padgett
Attorney, Agent, or Firm—Spencer T. Smith

[57] ABSTRACT

A trough assembly for the delivery of gob to mould cavities in a glassware forming machine comprises an upwardly facing trough and a downwardly facing deflector which are supported in the machine by a hanger. The hanger comprises a supporting member which can be fixed in the frame of the machine, a first flexible hanger member extending axially in a bore of the supporting member and a second rigid hanger member fixed to the first flexible member. The trough and the deflector are supported by the second hanger member and small adjustments of their position may be obtained by flexing of the flexible member and movement of the rigid member in the bore of the supporting member.

2 Claims, 2 Drawing Sheets

5,549,727

TROUGH ASSEMBLY

The present invention relates to improvements in means for delivering gobs of glass to the moulds of glassware forming machines.

BACKGROUND TO THE INVENTION

In the well known I.S. type of glassware forming machines, a number (generally from 8 to 16) of individual sections of the same construction are mounted side by side, and are arranged to operate out of phase with each other so that a substantially continuous flow of formed glassware is produced. Each section normally contains parison forming moulds and blow moulds, and may be constructed to receive 1,2,3 or 4 gobs of molten glass at a time into the corresponding number of parison moulds, in which the gobs are formed into parisons, which parisons are then transferred to the blow moulds and formed into the desired shape.

The gobs are supplied to the parison moulds through trough assemblies to which gobs are provided by a gob distributor. There is a trough assembly associated with each section, and the gob distributor is arranged to provide the required number of gobs to each trough assembly in turn through a number of scoops which are moved into alignment with upper end portions of the trough assembly.

Each trough assembly comprises, associated with each mould cavity of the section, an upwardly facing inclined trough, which carries a gob from the scoop into a position above and to one side of the parison mould, and a downwardly facing deflector which deflects a gob travelling down the trough into a vertical path to fall into the cavity of the parison mould.

It can be seen that, for each gob, a pathway is provided by the scoop, the upwardly facing trough and the downwardly facing deflector. It is essential to ensure that a gob arrives at the parison mould in its desired condition that this pathway is smooth, and does not comprise any changes of direction in a vertical plane. Consequently it is necessary to ensure that the three components are accurately aligned, in particular that, viewed in plan, there is no 'dog leg' formed.

The alignment and orientation of the scoop is determined by the gob distributor.

The trough has an upper end portion which comprises two downwardly facing slotted lugs, which are fitted over a supporting rod which extends arcuately across the machine, and is located transversely on the rod by a locating block fixed to the rod and lying between the slotted lugs. A small amount of play length wise of the rod may occur, and the trough is free to move angularly about the rod.

A lower end portion of the trough is supported by a complex bracket which is supported by a hanger from a beam extending transversely across the machine. In general one hanger is provided for each section, irrespective of the number of cavities (i.e. number of troughs) in the section.

The deflector comprises an upper end portion which is supported by the aforementioned bracket, and a lower end portion which has a transverse lug with a vertical bore in it. This bore fits over a locating pin which is adjustable about x and y axes to enable adjustment of the position of the lower end portion of the deflector in relation to the associated mould cavity.

When it is necessary, in the operation of the machine, to adjust the position of the deflector, for example if there is a change of gob size, the position of the locating pin is adjusted to move the lower end portion of the deflector into the desired position. During operation of the machine it is in general not feasible to adjust the bracket which supports the upper end portion of the deflector and the lower end portion of the trough and consequently such adjustment of the deflector may cause the deflector and the trough to become misaligned into a 'dogleg', which can cause irregularities in the shape of the gob delivered to the mould and in its delivery time.

In U.S. Pat. No. 5,298,049 there is disclosed a trough assembly for the delivery of a gob of molten glass from a gob distributor to a parison mould cavity in a glassware forming machine comprising an upwardly facing inclined trough which is arranged to receive a gob from a scoop of the gob distributor and a downwardly facing deflector which deflects a gob which has travelled down the trough into a vertical path to fall into the parison mould cavity in which the deflector and the trough are mounted on a hanger which is supported in a frame member of the machine by a universal joint adjustable about three perpendicular axes. In this assembly adjustment of the position of the deflector may be made without causing misalignment of the deflector and the trough. However it suffers from a disadvantage in that the universal joint is expensive to manufacture.

It is an object of the present invention to provide a trough assembly of economical construction which allows for adjustment of the deflector and trough.

BRIEF STATEMENT OF THE INVENTION

The present invention provides a trough assembly for a glassware forming machine to enable a gob of molten glass from a gob distributor to be delivered to a parison mould cavity of the machine the assembly comprising an upwardly facing inclined trough to receive a gob from the gob distributor a downwardly facing deflector defining a vertical axis, the deflector deflecting a gob which has travelled down the trough into a vertical path along the vertical axis, which axis may be aligned with a parison mould cavity a hanger which is adapted to be supported in a frame member of the machine and which supports the trough and the deflector the hanger comprising a supporting member which can be secured in the frame member of the machine and comprising a vertical cylindrical bore having a vertical axis a first, flexible, hanger member extending axially in the bore of the supporting member and having an upper end portion fixed to the supporting member a second, rigid, hanger member fixed to a lower end portion of the first hanger member and comprising a cylindrical upper end portion which is positioned in the bore of the supporting member, and a lower end portion which supports the deflector and the trough, and the arrangement being such that the vertical axis of the supporting member and the vertical axis of the deflector are normally in alignment, but the deflector may be adjusted in position by pivotal movement of the rigid hanger member, the flexible hanger member flexing to allow such movement and clearance between the bore of the supporting member and the upper end portion of the rigid hanger member restricting its extent.

DESCRIPTION OF THE INVENTION

Figure 1:
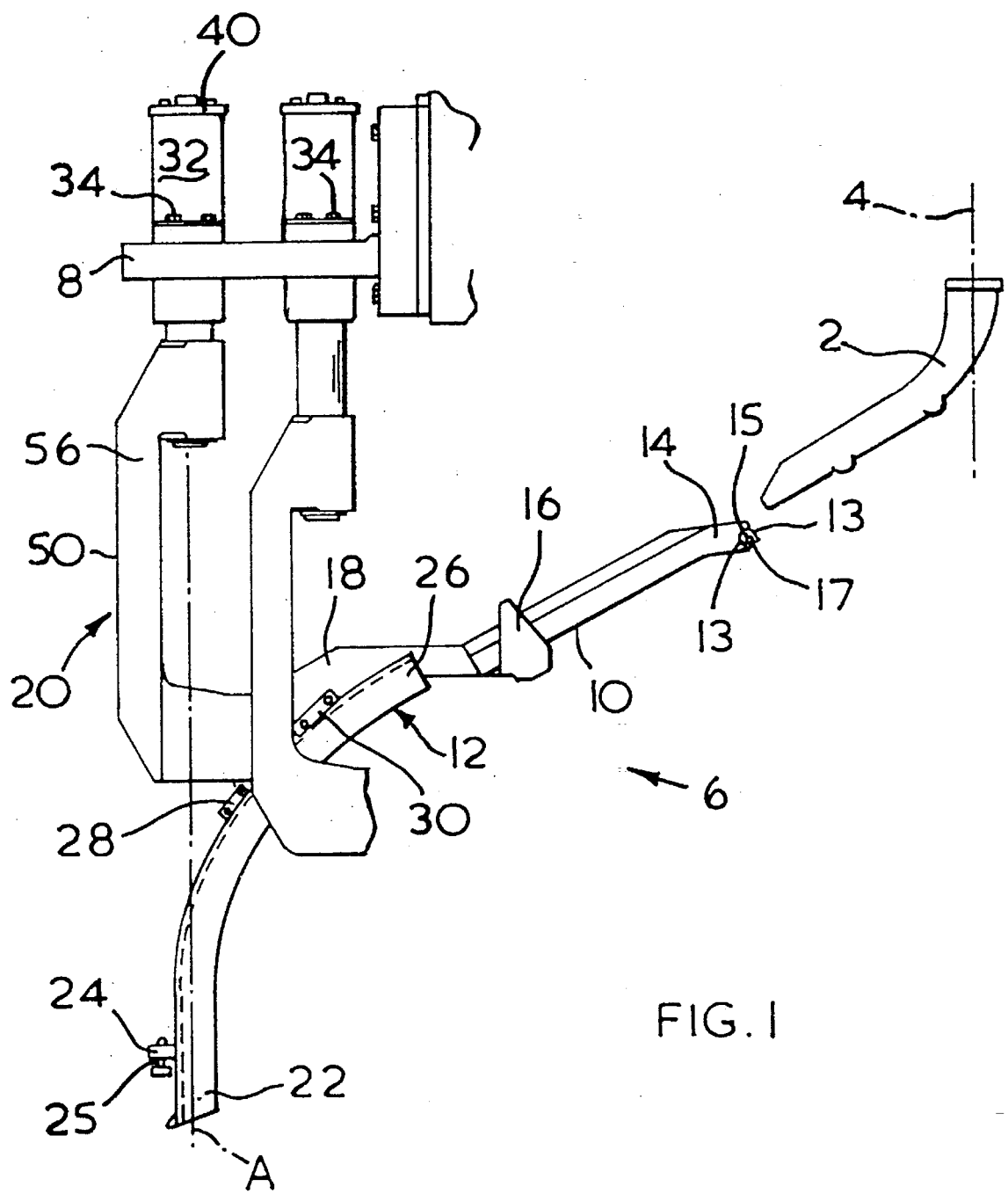
FIG. 1 is a side view of a trough assembly embodying the invention.
Figure 2:
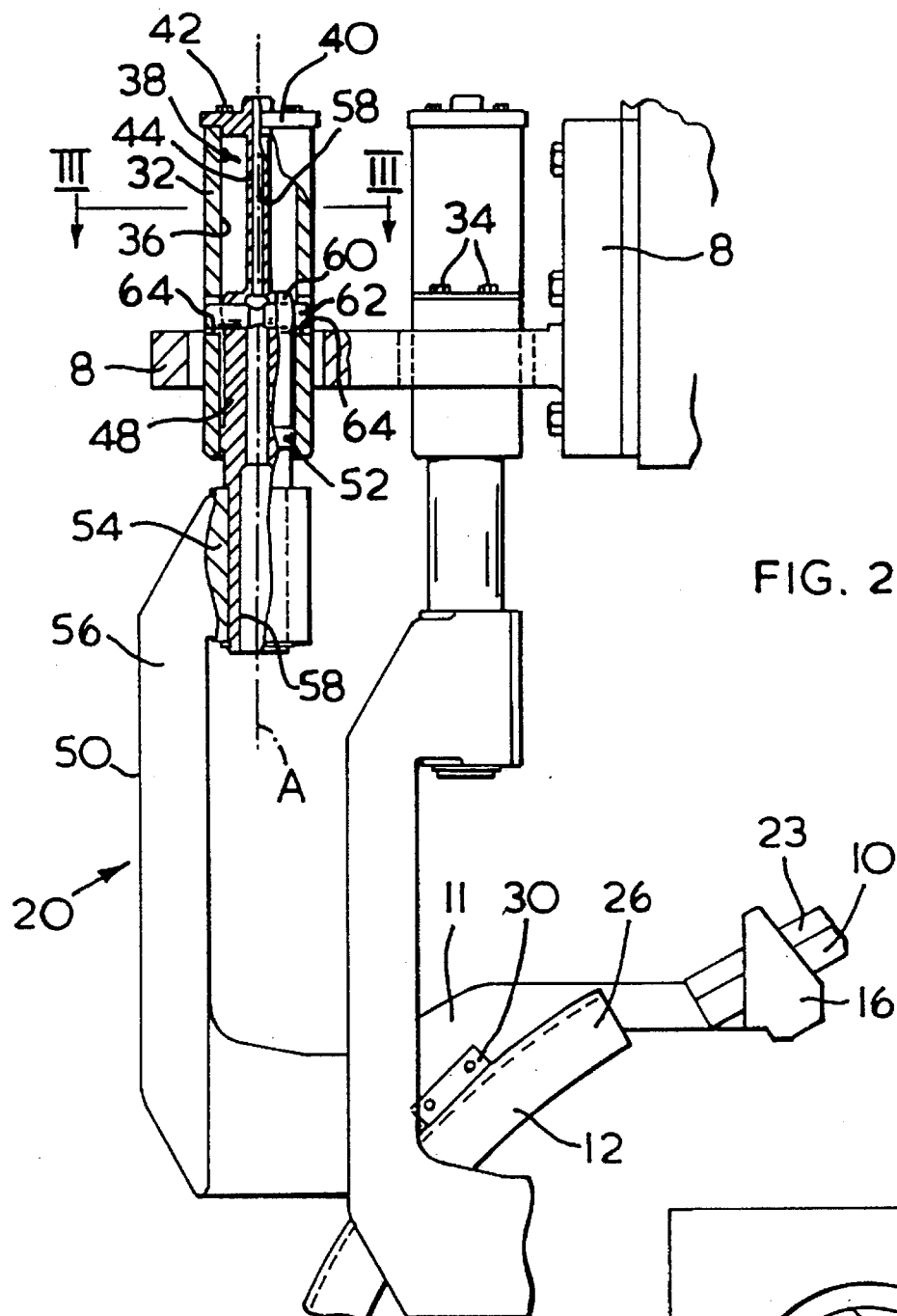
FIG. 2 shows details of parts of FIG. 1, partly broken away and in section.
Figure 3:
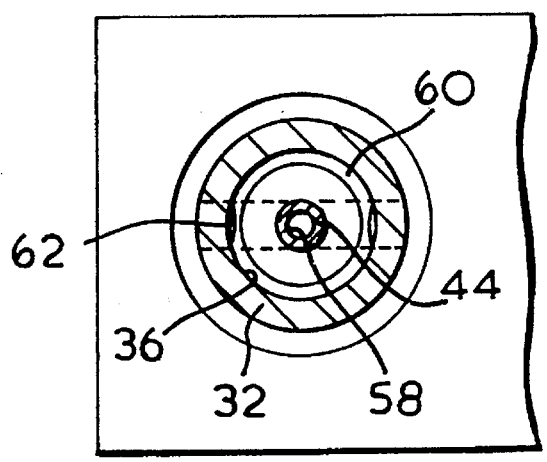
FIG. 3 shows a view in cross section taken along III—III of FIG. 2.

One trough assembly as shown in FIG. 1 is for use in association with each section of a glassware forming machine of the I.S. type to enable a gob of molten glass from a gob distributor (not shown) to be delivered to a parison mould cavity of the section of the machine.

The gob distributor comprises a scoop 2 which can be rotated about a vertical axis 4 to bring it into line in turn with each of the trough assemblies 6.

The forming machine is provided with a beam 8 which extends across all the sections of the machine. The trough assembly comprises an upwardly facing inclined trough 10 to receive a gob from the scoop 2 of the gob distributor, and a downwardly facing deflector 12 defining a vertical axis A the deflector 12 deflecting a gob which has travelled down the trough 10 into a vertical path along the axis A which axis may be aligned with a parison mould cavity.

The trough 10 has an upper end portion 14 which comprises two spaced downwardly extending lugs 13, each having a slot 15. Secured to a rod 17, which extends across the forming machine in a curve around the gob distributor, is a clamp block. The trough 10 hangs on the rod 17 with the rod 17 in the slots 15 and the lugs 13 on opposite sides of the clamp block. The trough 10 is thus free to move angularly about the rod 17, and is capable of limited angular movement with respect to the clamp block about a vertical axis as there is a certain amount of play between the clamp block and the lugs 13.

The upper end portion 14 is thus held in alignment with the scoop 2 when the scoop is in its appropriate position. A lower end portion of the trough 10 is mounted in a bracket 16 which is secured to a support member 18 of a hanger 20. The deflector 12 has a lower end portion 22 which has a lug 24 with a vertical hole in it: this lug is fitted over a pin 25 which is secured in the machine and is capable of limited adjustment in a horizontal plane so that the precise position of the lower end portion 22 can be adjusted. An upper end portion 26 of the deflector is also secured to the support member 18 by two brackets 28, 30.

It can be seen that by appropriate adjustment of the pin 25 the lower end portion 22 of the deflector 12 can be correctly positioned over the parison mould of the section. The deflector 12 and the trough 10 are aligned with each other and secured in position by the brackets 16, 28 and 30.

The hanger 20 comprises a supporting member 32 which is secured to the beam 8 by four bolts 34 through opposed side flanges of the member 32. The hanger 20 has a vertical cylindrical bore 36 which has a vertical axis which is normally aligned with the axis A. A first, flexible, hanger member 38 comprises at its upper end portion a disc 40 which is secured to the supporting member 32 by bolts 42, and a flexible tubular portion 44 which extends axially in the bore 36. A second, rigid, hanger member 50 is secured to the lower end portion of the flexible member 38; in the embodiment shown the flexible member 38 is in fact integral with an upper, cylindrical end portion 48 of the rigid hanger member. The cylindrical portion 48 is positioned in the bore 36 of the supporting member 32 and comprises a machined collar 52. A clearance of about 0.8 mm in any direction is provided between the collar 52 and the bore 36 while a larger clearance of about 2.0 mm in any direction is provided between the remainder of the cylindrical portion 48 and the bore 36.

The hanger 20 further comprises a cylindrical boss 54 which is welded to the cylindrical portion 48, and an arm portion 56 which at its upper end is clamped to the boss 54 and at its lower end provides the supporting member 18 which supports the deflector 12 and the trough 10.

A through passage 58 is provided through the first flexible hanger member, the cylindrical portion 48 and the boss 54. The supporting member 18 is somewhat cranked in a horizontal plane so that the through passage 58 may be used with an optical or physical plumb line to align the axis of the supporting member 32 and of the deflector 12 with a parison mould cavity.

The arrangement is such that, in each section, each mould cavity and the deflector associated with it is associated with a separate hanger—that is to say the spacing between the supporting members 32 corresponds to the spacing of the parison mould cavities.

It can also be seen that the arrangement is such that the vertical axes of the supporting member 32 and of the deflector 12 are normally in alignment, and can be aligned with a mould cavity by adjustment of the supporting member 32 in the beam 8. However occasion may arise (for example upon changing of gob size) when it is desired to adjust the position of the deflector by a small amount, and the supporting member 18 can be moved in any direction from its aligned position to an extent of about 1.25 cm in any direction. On such movement of adjustment being effected, the tubular portion 44 ends between the points at which it is fixed to the supporting member 32 and to the cylindrical end portion 48 of the rigid hanger member. This cylindrical end portion 48 has a spherically rounded upper end portion 60, which allows the portion 48 to pivot, essentially about the centre of the spherical portion 60. A pin 62 secured in the upper end portion 60 extends through two opposed holes 64 in the supporting member 32 and prevents any torsional movement of the rigid member 50.

The hanger 20 is not only cheaper to manufacture than the hanger described in EP 564090 but also, while allowing for ready adjustment of the position of the trough and the deflector, shows a desirable rigidity and resistance to vibration when in use.

I claim:

1. A trough assembly for a glassware forming machine for receiving a gob of molten glass from a gob distributor and delivering the gob to a parison mold cavity of the machine, said trough assembly comprising a trough for receiving a gob from the gob distributor, a deflector for receiving the gob from said trough and deflecting the gob into a vertical axis for delivery from the end of said deflector into the parison mold cavity, an arm, means for securing said trough and said deflector on said arm, means for supporting said arm so that the end of said deflector can be relocated anywhere within a selectively sized circle about said vertical axis, said means including a hanger member assembly having a support having a vertical bore, a hanger member having a top portion secured to said support over said vertical bore, an elongated flexible portion extending downwardly from said top portion, a spherical portion at the bottom of said elongated flexible portion, and a rigid bottom portion extending downwardly from said spherical portion to a location outside of said vertical bore, and means for securing said arm to said bottom portion, said spherical portion located within said vertical bore and being selectively sized to fill said vertical bore so that relocation of said deflector from said vertical axis will pivot said spherical portion about its center and bow said elongated flexible portion.

2. A trough assembly according to claim 1, wherein said bottom portion includes a cylindrical collar located within said vertical bore and having a size selected to define a selected annular clearance between said collar and said vertical bore so that relocation of said deflector will be restricted to said selectively sized circle.

* * * * *